United States Patent

[11] 3,619,496

[72] Inventor Bernard Lichtenstein
Fair Lawn, N.J.

[21] Appl. No. 828,838
[22] Filed May 29, 1969
[45] Patented Nov. 9, 1971
[73] Assignee Ocean Metrics, Inc.
Fairfield, N.J.

[54] TELEVISION BRIGHTNESS CONTROL SYSTEM
1 Claim, 4 Drawing Figs.

[52] U.S. Cl. .......... 178/7.3 D, 178/DIG. 28, 178/6, 250/213
[51] Int. Cl. .......... H04n 5/72, H01j 31/50
[50] Field of Search .......... 178/7.3 DC, 7.5 DC, 7.3 R, 7.3 D, 7.5 R, 7.5 D, 6, 6.8, DIG. 8, DIG. 28; 250/213; 323/4; 313/65

[56] References Cited

UNITED STATES PATENTS 3,198,947 8/1965 Arrison, Jr. et al. .......... 250/99
3,231,746 1/1966 Goodrich .......... 178/5.2

*Primary Examiner*—Robert L. Griffin
*Assistant Examiner*—John C. Martin
*Attorney*—George B. Oujevolk

ABSTRACT: A circuit arrangement for providing an output image of constant brightness on the television tube image of a television receiving system over a wide range of illuminations. The system comprises image intensifier means coupled to the television image tube, and a current limiting impedance on the input side thereof. Feeding a control signal to the image intensifier means across the current limiting impedance is a thyratron means, e.g., a thyratron tube or SCR transistors. The control electrode of the thyratron means serves to receive a sync pulse. In parallel with said thyratron means and said current limiting impedance is a capacitor disposed to charge when the control electrode maintains the thyratron means in a nonconductive state, the capacitor means controlling the thyratron means anode electrode. A diode is interposed between the thyratron cathode and the capacitor to prevent feedback into the thyratron means cathode.

BERNARD LICHTENSTEIN
*INVENTOR.*

BY George B. Oujevolk
ATTORNEY

TELEVISION BRIGHTNESS CONTROL SYSTEM

The present invention relates to a television system wherein an output image of constant brightness is automatically provided over a very wide range of variation in scene illumination. This means that the sensing mechanism sensing the scene to be transmitted will be self-adjusting to provide a picture of constant brightness though the scene being viewed may experience a variation of illumination from bright sunlight to a moonless overcast night which represents a dynamic range in excess of $1\times10^9$ to 1.

Figure 1:
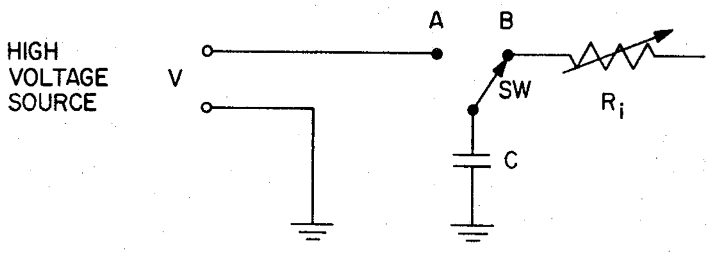
Figure 2A:
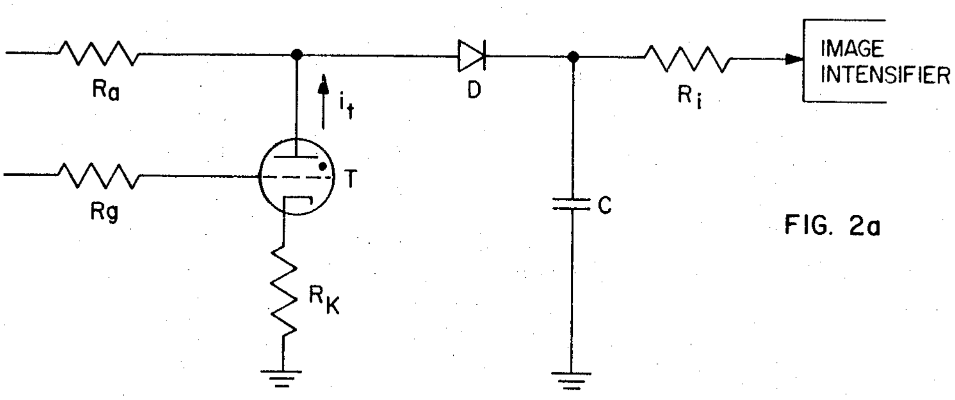

The invention as well as the other objects and advantages thereof will be better understood from the following detailed description when taken together with the accompanying drawing in which:

FIG. 1 is a schematic drawing illustrating the theoretical concept of the invention;

FIG. 2*a* shows a schematic illustration of the inventive concept, wherein the switch shown in FIG. 1 is the thyratron of FIG. 2*a;*

Figure 2B:
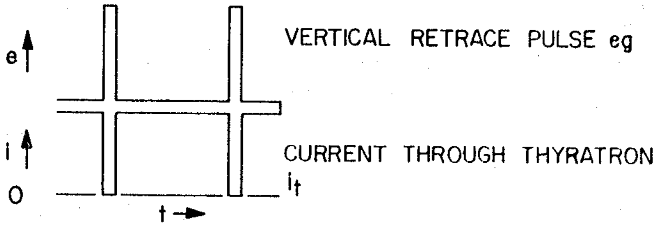
Figure 3:
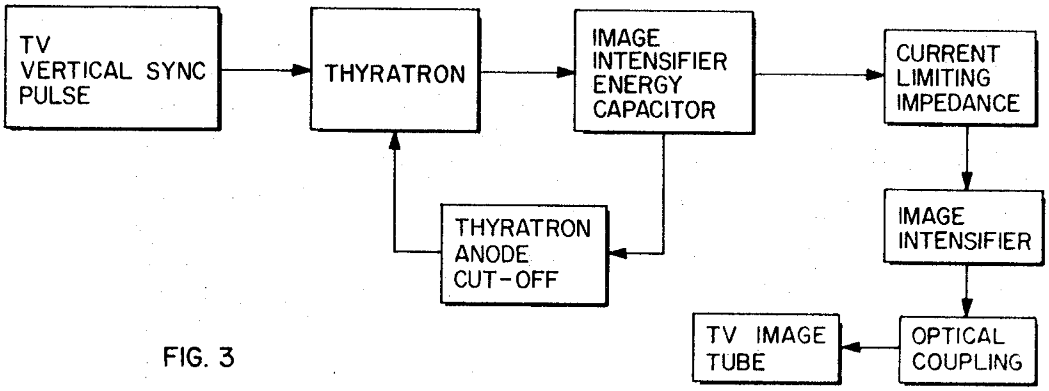

FIG. 2*b* is a wave form diagram used for the understanding of FIG. 2*a*, and,

FIG. 3 is a block diagram of the inventive concept. Before describing the circuitry depicted in the accompanying drawing, it is first advantageous to describe the theoretical basis for a device and its application to a practical working configuration. The arrangement is predicated on special circuitry used in conjunction with an image intensifier or an equivalent device which has the capability of amplifying a low light level signal.

The gain of an image intensifier is the ratio of energy falling ($\mu_1$) on the photocathode to the corresponding energy ($\mu_o$) emitted by the phosphor screen. This relationship is expressed by the following equation:

$$G=\frac{VeQ\lambda A}{hc}\times10^7=\frac{\mu_0}{\mu_1} \qquad (1)$$

where, $Q$ = product of quantum photon efficiency and phosphor conversion efficiency $V$ = anode voltage $\lambda$ = wavelength of scene illumination $h$ = Planck's constant $6.63\times10^{-27}$ erg-second $c$ = velocity of light = $3\times10^8$ meters/second $A$ = photocathode area/phosphor screen area By rewriting equation 1, equation (2) is obtained which shows that the output energy $\mu_0$ per TV frame is directly proportional to the product of $\mu_V$.

$$\mu_0=[\mu_1 V]\frac{eQ\lambda A}{hc}\times10^7 \qquad (2)$$

Hence by devising to keep the product constant, it becomes possible to keep $\mu_0$ constant within the inherent operating range of the image intensifier tube. The accomplishment of this technique is the basis of the circuitry herein described. It is also important to the circuitry that maintaining constant brightness is not done at the expense of the system resolution of the television image.

Equation (3) shows that the system resolution of a television image is a function of the received energy $\mu$.

$$n=MTF\sqrt{\frac{\mu_1(S/e)C_o^2}{k_a^2 f(\mu,n)}} \qquad (3)$$

where, $n$ = TV resolution in lines $\mu_1$ = received energy in joules/sq.in. $S$ = radiant sensitivity of receiver photocathode $e$ = Coulombs/electron $C_o$ = observed contrast $k_a$ = signal/noise ratio $f(\mu,n)$ = receiver noise figure MTF = system high light resolution response It can be seen from the foregoing that if the effective received energy $\mu_1$ can be kept constant by varying the anode voltage of equation (1), then the television system resolution also remains constant over a wide range of scene illumination. If $\mu_c$ is the available energy in a charged capacitor, then, $$\mu_c=CV^2/2 \qquad (4)$$

where, $C$ = capacitance in farads $V_c$ = capacitor voltage

Referring now to FIG. 1 of the drawing, when the Switch SW is in position A, the capacitor C is charged to a voltage $V_c$. When the switch moved to position B, the capacitor C is removed from the power supply and is inserted into the image intensifier path which has an internal resistance of $R_i$. The value of the resistance $R_i$ varies inversely with the illumination density impinging upon the cathode plate. If the triggering of the capacitor is done by using the vertical retrace pulse, the high voltage switching tube is used to provide electronic switching. The current which flows through the image intensifier is given by the following expression;

$$i(t)=\frac{V_0}{R_i}e-\frac{t}{R_iC} \qquad (5)$$

Equation (5) shows that when the scene illumination is high, the corresponding value of $R$is low resulting in a high photoelectric current with a short time constant. When the scene illumination is low, $R_i$ is high which results in a smaller current flow but with a longer time constant. The net effect is that the resultant output of the image intensifier can be made constant and independent of variations in scene brightness. In this way, constant brightness control is accomplished within the image intensifier element. The resulting image can then be coupled to an appropriate display by optical and/or electronic means for viewing and interpretation.

In the light of the foregoing theoretical explanation, assume therefore that a fixed charge is placed on capacitor C during the vertical retrace period of each field or frame which is triggered by the vertical retrace pulse itself or by a synchronized external switch prior to exposing an image intensifier photo. The capacitor discharge path is through the photocathode phosphor anode path of the image tube. Since the energy of the capacitor is fixed, allowing it to discharge during one TV field serves to limit the number of photoelectric events which occur at the photocathode of the image intensifier.

The circuit shown below is normally conducting. The TV vertical sync pulse is applied to the grid $R_g$ of the thyratron T. The grid signal is sufficiently large to keep the tube in a nonconducting state. When the tube is not conducting, capacitor C is being charged. When the vertical sync pulse is removed, the thyratron switches to its conducting state and the current flowing through $R_a$ causes a voltage drop large enough to halt the charging of the capacitor. There is a high-voltage diode D which prevents the capacitor from discharging through the thyratron thus enabling the capacitor to discharge through the image intensifier. This process is repeated during each frame of the field, typically 60 times per second. High-brightness scenes will cause the capacitor to discharge more rapidly than Low-brightness scenes.

A complete circuit is shown in the block diagram of FIG. 3 wherein the vertical sync pulse 10 is applied to a thyratron tube 12. The output of the thyratron tube 12 is in turn controlled by the image intensifier energy capacitor 14 the control being achieved by the thyratron anode cutoff 16. The output of the image intensifier energy capacitor 14.

As shown in FIG. 2*b* the current through thyratron of $i_t$ during the time $t$ is controlled by the vertical retrace pulse e.g. acting on the anode resistance $R_K$ of thyratron tube T.

It is to be observed therefore that the present invention is directed to a circuit arrangement for providing an output image of constant brightness on the television tube image of a television receiving system over a wide range of illuminations. The system comprises image intensifier means coupled to the television image tube, and a current limiting impedance on the input side thereof. Feeding a control signal to the image intensifier means across the current-limiting impedance is a thyratron means, e.g. a thyratron tube or SCR transistors. The control electrode of the thyratron means serves to receive a sync pulse. In parallel with said thyratron means and said current limiting impedance is a capacitor disposed to charge when the control electrode maintains the thyratron means in a nonconductive state, the capacitor means controlling the thyratron means anode electrode. A diode is interposed between the thyratron cathode and the capacitor to prevent feedback into the thyratron means cathode.

Furthermore the equations herein contained will be found in the following reference texts:

"Laser Illuminated Imaging"; Smith/Nodd/Kay, Air Force Report Contract AF 33 615–2005.

I claim:

1. In a television receiving system, a circuit arrangement to provide an output image on the television image tube of constant brightness over a wide range of scene illuminations, comprising in combination:

a. image intensifier means coupled to the television image tube, and a current-limiting impedance on the input side thereof;
b. thyratron means including control, anode and cathode electrodes, feeding a control signal to said image intensifier means across said current limiting impedance, said control electrode serving to receive a sync pulse regulating the image frames of said tube;
c. capacitor means in parallel with said thyratron means and disposed to charge when said control electrode maintains said thyratron means in a nonconductive state, said capacitor means controlling said image intensifier means and,
d. diode means interposed between said cathode electrode and said capacitor means preventing feedback into said cathode electrode.

* * * * *